US005937894A

United States Patent [19]

Rojey

[11] Patent Number: 5,937,894

[45] Date of Patent: Aug. 17, 1999

[54] SYSTEM AND METHOD FOR TRANSPORTING A FLUID SUSCEPTIBLE TO HYDRATE FORMATION

[75] Inventor: Alexandre Rojey, Rueil Malmaison, France

[73] Assignee: Institut Francais du Petrole, Rueil-Malmaison, France

[21] Appl. No.: 08/687,984

[22] Filed: Jul. 29, 1996

[30] Foreign Application Priority Data

Jul. 27, 1995 [FR] France .................................. 95 09273

[51] Int. Cl.$^{6}$ .............................. F16K 31/12; E03B 1/00

[52] U.S. Cl. ................................ 137/485; 137/3; 48/196

[58] Field of Search .......................... 137/485, 3; 48/196

[56] References Cited

U.S. PATENT DOCUMENTS

| | | | |
|---|---|---|---|
| 3,057,706 | 10/1962 | Marshall, Jr. et al. | 48/196 |
| 3,331,214 | 7/1967 | Proctor et al. | 48/196 |
| 5,420,370 | 5/1995 | Sloan, Jr. | 137/3 |
| 5,491,269 | 2/1996 | Colle et al. | 137/3 |

*Primary Examiner*—Denise L. Ferensic
*Assistant Examiner*—Joanne Y. Kim
*Attorney, Agent, or Firm*—Antonelli, Terry, Stout & Kraus, LLP

[57] ABSTRACT

Method for producing and/or transporting by pipeline, from a location such as a reservoir to a point of destination, a multi-phase fluid susceptible to the formation of hydrates under given thermodynamic conditions. During production and/or transportation, at least one relationship is determined between at least two physical parameters associated with hydrate formation, such as the pressure P, the temperature T and/or a parameter associated with the composition of the fluid or the composition of the fluid itself, the said relationship defining at least one range within which hydrates form. At least one of the physical parameters is measured and, using the relationship and/or the established formation range and a processing and control device, at least one of the physical parameters is adjusted in order to bring and/or maintain the fluid outside the hydrate formation range.

15 Claims, 7 Drawing Sheets

SYSTEM AND METHOD FOR TRANSPORTING A FLUID SUSCEPTIBLE TO HYDRATE FORMATION

BACKGROUND OF THE INVENTION

The present invention relates to a method and a system enabling the formation of hydrates to be prevented in a fluid containing at least one gaseous phase and one aqueous phase whilst it is being transferred from one location to another under conditions that may vary and induce the formation of hydrates.

The present invention is of particular advantage when applied as a means of preventing the formation of hydrates of light hydrocarbons, such as the hydrates of natural gas, petroleum gas or other gases within a fluid.

These hydrates may form where water is to be found in the presence of light hydrocarbons, either in a gaseous phase or dissolved in a liquid phase, such as a liquid hydrocarbon, and in particular if the temperature of the mixture falls below a critical temperature (thermodynamic temperature at which hydrates form), which is dependent on the composition of the gases and the pressure. These latter are inclusion compounds which result when water molecules assemble to form cages in which the molecules of light hydrocarbons such as methane, ethane, propane or isobutane are trapped. Some of the acid gases present in natural gas, such as carbon dioxide or hydrogen sulphide, may also form hydrates in the presence of water.

It will be recalled that in the case of a multi-phase fluid containing an aqueous phase and a gaseous phase, when the temperature and pressure vary, it is possible to determine a range within which hydrates form on the basis of the composition of the fluid, this range being limited by a pressure curve and the temperature of a given composition.

In order to reduce the cost of producing crude oil and gas, both in terms of capital investment and development, one of the options considered, particularly in offshore production, is to reduce or even do away with all processing of crude oil or gas to be transported from the reservoir to the coast and in particular to leave all or some of the water in the fluid to be transported. The petroleum effluent is then transferred by pipeline in the form of a multi-phase fluid to a processing platform. This approach is of particular advantage if the offshore production site is located in a zone that is difficult to access. Nevertheless, it does have a major disadvantage in that there is a risk of hydrate formation due to the presence of water and the inherent conditions, particularly the surrounding environment.

In practice, petroleum effluent containing a gaseous phase and possibly a liquid phase can be made up of a natural gas, a condensate gas or an associated gas, for example, mixed with the crude oil. They are generally saturated with water and in some cases may even contain free water.

When transporting production effluent along the seabed from a subsea natural gas or oil and gas reservoir containing water, the prevailing temperature may be quite low, in the region of a few degrees, and the temperature of the effluent changes as it passes along the pipe and may reach relatively low levels at which the conditions are conducive to hydrate formation.

These hydrates cause the transportation pipelines to fill up and block, which eventually prevents the oil or gas from passing through and leads to extremely serious consequences: production downtime can often be quite protracted since it is very difficult to break hydrates down once they have formed, which then incurs substantial financial losses.

Under the requisite thermodynamic conditions, other parameters may also induce hydrate formation, such as changes in the shape of the pipe, for example elbows, as well as variations in the flow speed and any occurrence of turbulence within the flow.

Conditions conducive to hydrate formation may also arise during a production stoppage or as a result of changes in the flow rate caused on the production side.

The present invention has the advantage of overcoming the potential consequences arising from variations in the effluent flow rate during production in the majority of petroleum production and transportation applications.

These variations in flow rate can cause major changes in the pressure and temperature profiles along the pipe, creating detrimental conditions in certain zones of the pipeline which could lead to hydrate formation.

This being the case, the present invention makes allowance for changes in the pressure and temperature profiles associated with variations in the flow rate as a means of controlling the conditions prevailing across the full length of pipeline and bringing and/or retaining the fluid outside the range within which hydrates form.

The same applies in the case of natural gas, which is also susceptible to hydrate formation under certain conditions.

Conditions conducive to hydrate formation can also occur in the same way onshore if pipes are buried close to the surface and the ambient air temperature is quite low, for example, especially in northern zones such as the arctic zones.

Various methods have been described in the prior art as ways of avoiding these drawbacks.

One method aimed at removing the water can be carried out on a platform located at the surface close to the reservoir so that the effluent, which is hot initially, can be treated before the effluent has been cooled by the sea water to the point at which hydrates form. However, this solution means that the effluent has to be brought up to the surface before it is transferred to a main processing platform and an intermediate processing platform has to be provided.

Another approach is to fit the transportation pipeline with insulating means or equip it with heating means, such as the device described in patent U.S. Pat. No. 5,241,147, so as to prevent the fluids from cooling too rapidly whilst being transported. However, such devices are costly, all the more so as they generally have to be provided to cope with the most difficult situations encountered.

Other methods involve the use of radiation. For example, patent HU 186511 discloses a method of emitting an electromagnetic wave, whose frequency values and propagation modes are selected for their ability to melt any hydrates that have formed.

In patent SU 442287, an ultra-sound wave is used to break up the hydrate crystals and release the trapped gas.

A technique such as this is costly and often harmful to the environment.

DESCRIPTION OF THE INVENTION

The present invention overcomes the drawbacks of the prior art and enables multi-phase effluent to be produced and transported at a reduced cost under thermodynamic conditions, pressure and temperature in particular, that might vary, whilst at the same time protecting the environment.

The present invention relates to a method of producing a multi-phase fluid and/or transporting by pipeline a multi-phase fluid containing at least one gaseous phase and water, the said fluid being susceptible to hydrate formation under given thermodynamic conditions, from a location such as a reservoir to a point of destination. It is characterised in that it consists of the following steps:

a) at least one relationship is determined between at least a first and a second physical parameter affecting hydrate formation, such as the pressure P, the temperature T and/or a third parameter associated with the composition of the fluid or the composition of the fluid itself, the said relationship defining at least one range within which hydrates form, b) at least one of the said physical parameters is measured, c) at least one of the said physical parameters is adjusted to bring and/or retain the fluid outside the range of hydrate formation.

In one embodiment, the physical parameter measured during step b), for example, is adjusted. By taking account of the relationship determined during step a), for example, and/or the hydrate formation range, the value of the physical parameter measured during step b) can advantageously be compared with a limiting value corresponding to a hydrate formation threshold, for example, and this value adjusted to maintain it below the critical value.

Another approach may be to adjust one of the non-measured physical parameters affecting hydrate formation.

In one embodiment, another parameter is determined, for example, and the value thereof is used in conjunction with the value of the physical parameter obtained during step b) to determine the temperature and/or pressure profiles along the pipe and, during step c), at least one of the said parameters is adjusted to bring and/or maintain the fluid outside the hydrate formation range.

The second parameter is the flow rate of the fluid, for example, which will enable a temperature profile and/or pressure profile along the pipe to be defined.

Alternatively, changes in the composition of the fluid can be determined over time and the relationship established during step a) linking the pressure and the temperature corrected.

It is of advantage to determine and regulate the value of the fluid flow rate in the pipe during a separate step from step c).

The pressure in at least one zone of the pipe may be the physical parameter measured during step b). Depending on the hydrate formation range and the prevailing temperature in the pipe, the processing device can then determine for each temperature value the limiting value of the pressure and, by maintaining the measured pressure value below this limiting value, maintain and/or shift the fluid outside the hydrate formation range.

The physical parameter measured during step b) may also be the temperature in at least one zone of the pipe and the temperature can be adjusted by applying thermal energy to the fluid, for example.

In this case, the heat output of an associated device is regulated.

The density of the fluid can be taken as the parameter associated with the composition of the fluid.

Alternatively, the parameter indicative of the composition of the fluid may be a concentration of an inhibitor product present in the said fluid and the value of the concentration adjusted by regulating the quantity or rate at which the inhibitor is injected into the fluid.

In another approach to implementing the invention, the physical parameter determined during step b) is the pressure in at least one zone of the pipe and the value of the said pressure is adjusted to bring and/or maintain the fluid outside the hydrate formation range as long as the pressure value is in excess of or equal to a set limiting value and, when the pressure is below the said limiting value P1, adjustments can then be made to the temperature, and/or the composition of the fluid by adding a certain quantity of inhibitors, thus maintaining and/or keeping the fluid outside the hydrate formation range.

The method of the invention is particularly useful in the event of a production stoppage. In this case, the value of the physical parameter determined during step b) can be adjusted so as to bring and/or keep the fluid outside the hydrate formation range.

The method of the invention is of particular advantage when applied to the transportation of a multi-phase petroleum effluent and/or the transportation of natural gas.

The present invention also relates to an installation or system enabling a multi-phase fluid containing at least one gaseous phase and water to be transferred by pipeline from a location such as a reservoir to a point of destination, the said fluid being susceptible to hydrate formation under given thermodynamic conditions.

It is characterised in that it consists in combination of:

at least one device for measuring at least one physical parameter indicative of the temperature and/or the pressure and/or a parameter associated with the composition of the fluid or the composition of the fluid itself, and a processing and control device capable of establishing and/or storing in memory a relationship between the physical parameters associated with hydrate formation, such as the pressure P, the temperature T and the composition of the fluid, defining the hydrate formation ranges, determining a limiting value for at least one of the said parameters and issuing at least one signal to adjust the value of at least one of the said physical parameters in order to bring and/or retain the fluid outside the hydrate formation range.

As a further advantage, it may incorporate a means for determining and controlling the value of the fluid flow rate in the pipe.

The device or devices for measuring at least one physical parameter may be positioned at the input of the pipe in the vicinity of the reservoir, for example, and/or at the pipe outlet in the vicinity of the point of destination.

The processing device is advantageously designed to determine the temperature profile prevailing in at least one portion of the pipe run and to derive therefrom the pressure limiting value at which hydrates will form in at least one portion of the pipe run.

The processing device may be capable of identifying and predicting zones where hydrates will form along the pipe.

The system may also incorporate an auxiliary means for preventing hydrate formation, such as a means for injecting an additive, connected to an external source and/or a heating device and/or a wave emission means, each of these devices being linked to the processing and control device, which will activate operation thereof when a threshold value has been reached.

The method and the system of the invention offer advantages when applied in the fields of oil and/or natural gas production, which are governed by increasingly strict regulations, particularly with regard to the emission of pollutants.

The system of the present invention therefore offers the following advantages:

it allows hydrate formation to be predicted and prevented in a simple manner by monitoring and adjusting at least one parameter affecting hydrate formation, such as the pressure, the temperature, the composition and/or a parameter indicative of the composition of the fluid, in order to maintain and/or bring the fluid outside the hydrate formation range, it may be used in conjunction with conventional means used to prevent hydrate formation, such as inhibitor additives and/or other processing means such as electromagnetic or ultrasound wave radiation and/or a heating means, in addition, it offers the option of controlling and regulating the value of the fluid flow rate so as to satisfy the requirements of the producer, and is able to do this independently of the process of adjusting the parameter outlined above.

BRIEF DESCRIPTION OF OTHER DRAWINGS

Other advantages and characteristics of the invention will become clear from the following description of embodiments in the context of specific applications, which are not limitative in any respect, relating to the transportation of a multi-phase petroleum fluid by pipeline from a production location to a processing platform, with reference to the attached drawings in which:

FIG. 1 is a general diagram illustrating the system of the invention for transporting a multi-phase fluid, FIG. 2 is a pressure and temperature chart showing the range of hydrate formation for a given fluid composition, FIGS. 3A and 3B show different hydrate formation charts which vary depending on the composition and density of the fluid, FIGS. 4A and 4B illustrate various configurations of the pressure adjustment means incorporated with a heating device and/or an inhibitor source, and FIGS. 5A, 5B and 5C show in detail various configurations of separate means for regulating the pressure and the flow rate.

DETAILED DESCRIPTION OF THE PREFERRED EMBODIMENT

The method implemented by the invention consists in monitoring and, if necessary, adjusting a parameter associated with the formation of hydrates, so as to keep and/or maintain the transported fluid or product, susceptible to hydrate formation, outside the hydrate formation range.

By preference, the pressure value is adjusted so that it is kept below a pressure limiting value associated with the formation of hydrates.

Advantageously, the system allows the value of the fluid flow rate to be adjusted independently of the parameter that has to be adjusted to keep the fluid outside the formation range.

To provide a clearer understanding of the invention, the description given below as an illustrative example but not limitative in any respect relates to the transportation of a multi-phase fluid, such as a petroleum effluent containing at least one gaseous phase and one aqueous phase, the said fluid being susceptible to the formation of hydrates when being transported from a location such as a reservoir to a point of destination such as a processing platform.

The effluent may also contain solid particles in the form of sand, for example.

Figure 1:
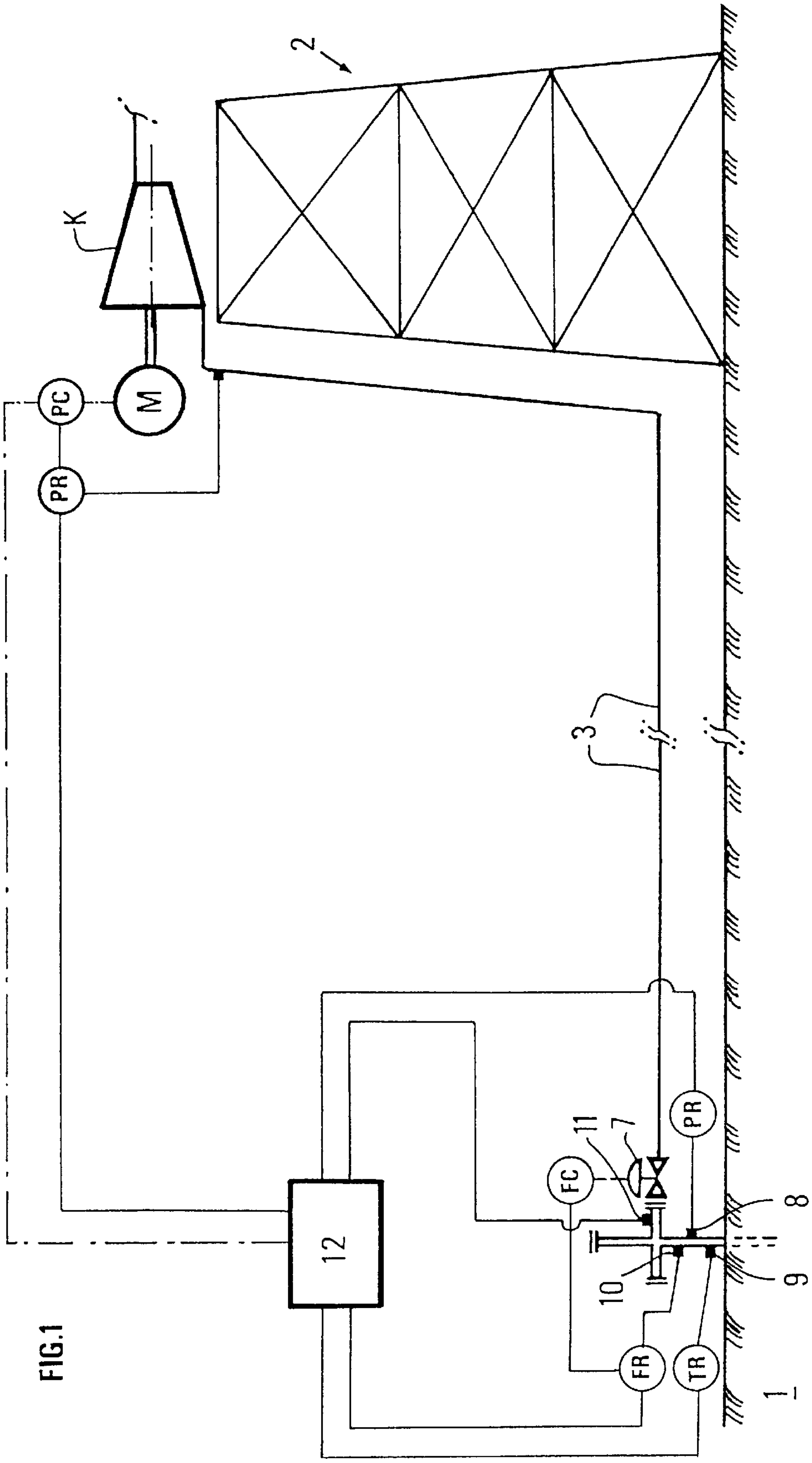

FIG. 1 illustrates an embodiment of a system of the invention installed in a production field and consisting of a well head 1 located at a certain distance from the main platform 2, for example, in which the multi-phase effluent is transported by transfer means 3 consisting of a pipeline linking the reservoir to the platform.

Several well heads may be linked to the main platform.

The well head 1 may be provided with equipment to set the well head pressure at a value specified by the producer as a means of obtaining a certain flow rate value for the effluent, for example a nozzle or a valve 7. This valve is preferably adjustable so that the value of the well head pressure and/or the production flow rate can be regulated at any time.

A pressure sensor 8, a temperature sensor 9 and a flow meter 10 are arranged in the vicinity of the reservoir, level with the well head for example, to measure the pressure and temperature of the effluent respectively.

Still within the scope of the invention, these sensors may alternatively be arranged and distributed along the length of the pipeline, and possibly located on the main platform, so as to increase the number of measuring points. The number and position of these sensors are selected to suit the data to be processed, some examples of which are given below.

A device 11 is also used to analyze the composition of the petroleum effluent and/or a parameter representing the composition and possibly the changes in these parameters over time. By preference, this device will be positioned at the location or in the vicinity of the location at which information about the flow composition is to be obtained, for example at the well head, or alternatively level with the processing platform.

The main platform may be equipped with means for directing the effluent to a final destination, consisting of a compressor K and its drive motor M.

The various measuring and analyzing means and devices (7, 8, 9, 10, 11) are linked to a processing and control device 12 that is capable of:

storing in memory, retrieving and processing the various measurements, such as the pressure, temperature, composition and/or a parameter associated with the composition of the effluent, and generating at least one signal to the auxiliary devices (not illustrated), the specific purpose of which is to adjust, if necessary, the value of at least one of the parameters indicating the formation of hydrates, such as the pressure P in the pipe 3 or, alternatively, the temperature or the composition.

The processing and control device is a micro-controller, for example, provided with a programme designed to carry out the different steps and trigger the actions of the method described below. The exchange of data may be continuous or in real time.

In the example illustrated in FIG. 1, the pressure at the pipe inlet is adjusted by modifying the drive speed of the compressor K directing the effluent by means of the motor M, controlled by a signal emitted by the processing and control device 12.

In the case of the temperature, heating means (13, FIG. 4A) may be used.

Figure 4A:
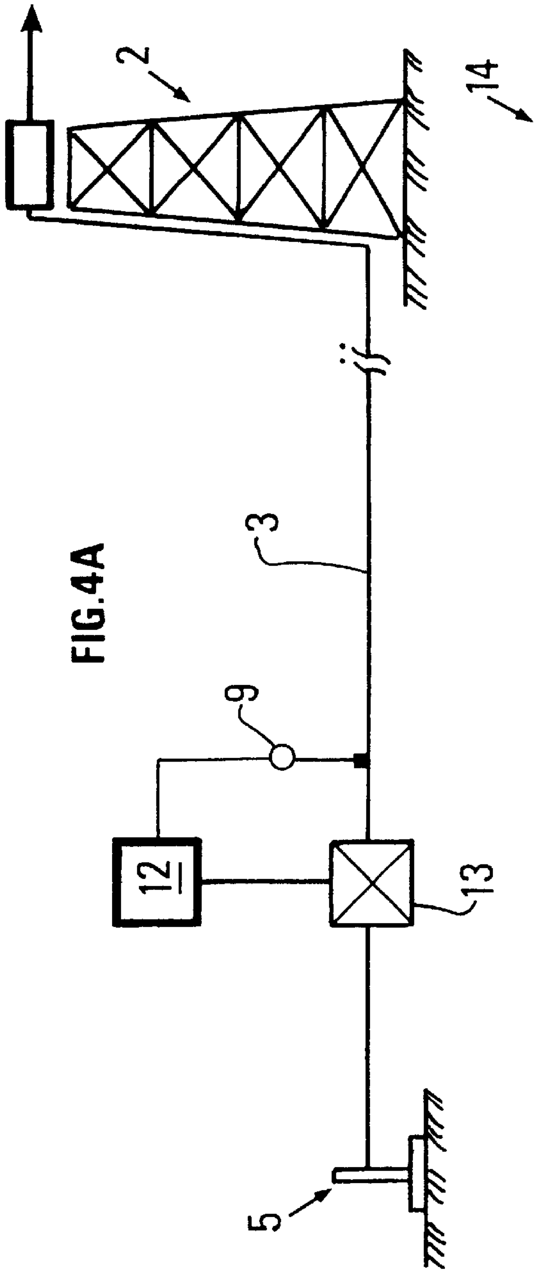
Figure 4B:
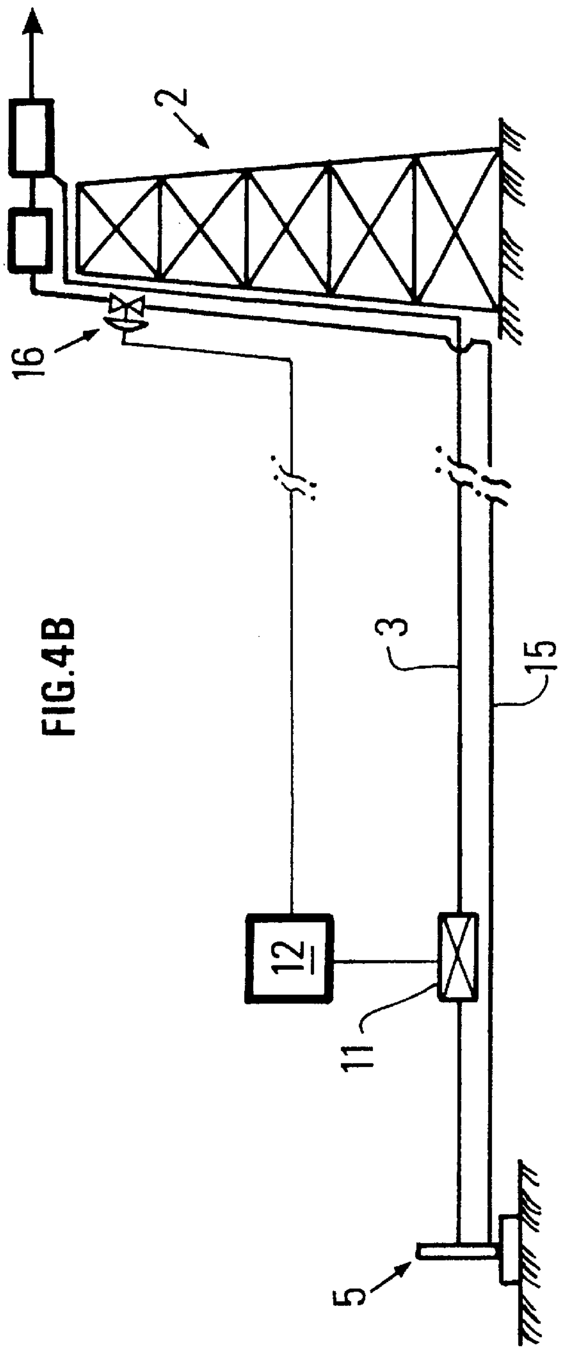

In the case of the composition, an auxiliary source of inhibitors may also be used, linked to the main pipe by means of a valve-operated pipe allowing the flow rate of the inhibitor fed into the pipe to be regulated, this valve being controlled by the processing and control device 12 (FIG. 4B).

Various examples of embodiments and adjustments are given with reference to FIGS. 4A, 4B.

An exchange of information is generated between the processing and control device 12 and the various measuring means and devices so that hydrate formation in a fluid can be prevented by keeping and/or bringing the fluid outside the hydrate formation range.

In the example described below, the flow rate is regulated by means of the control valve 7, separately from the pressure adjustment, produced by modifying the rotation speed of the compressor. A device of this type can compensate specifically for any variation in the effluent flow rate that might arise due to an action or actions undertaken as a means of preventing hydrate formation, for example subsequent to a reduction in pressure.

Figure 5A:
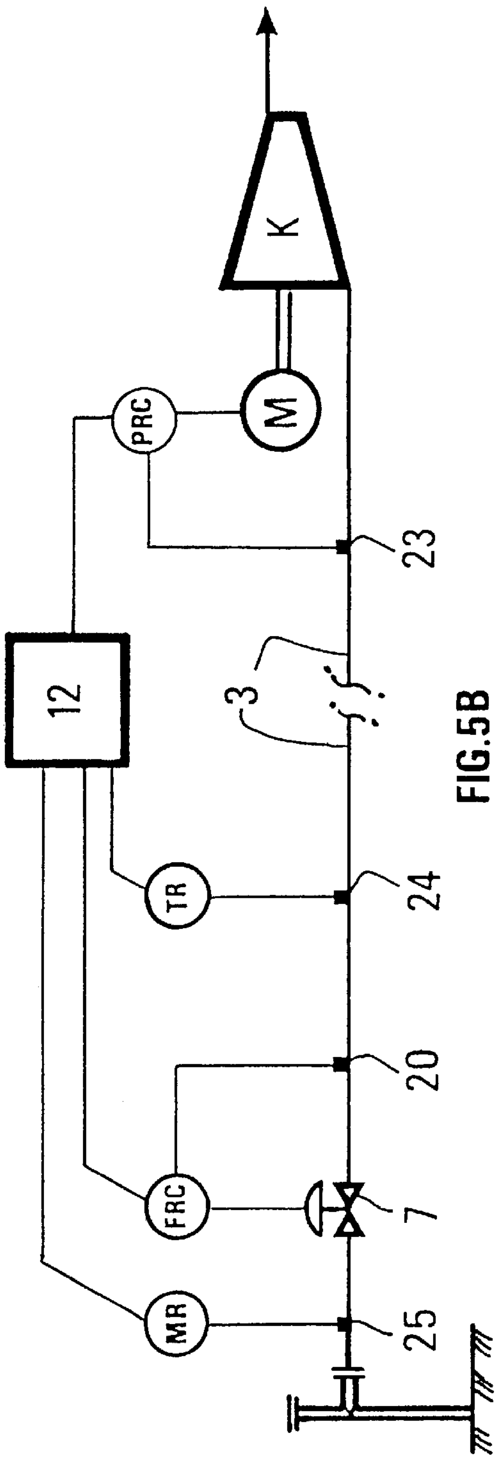
Figure 5B:
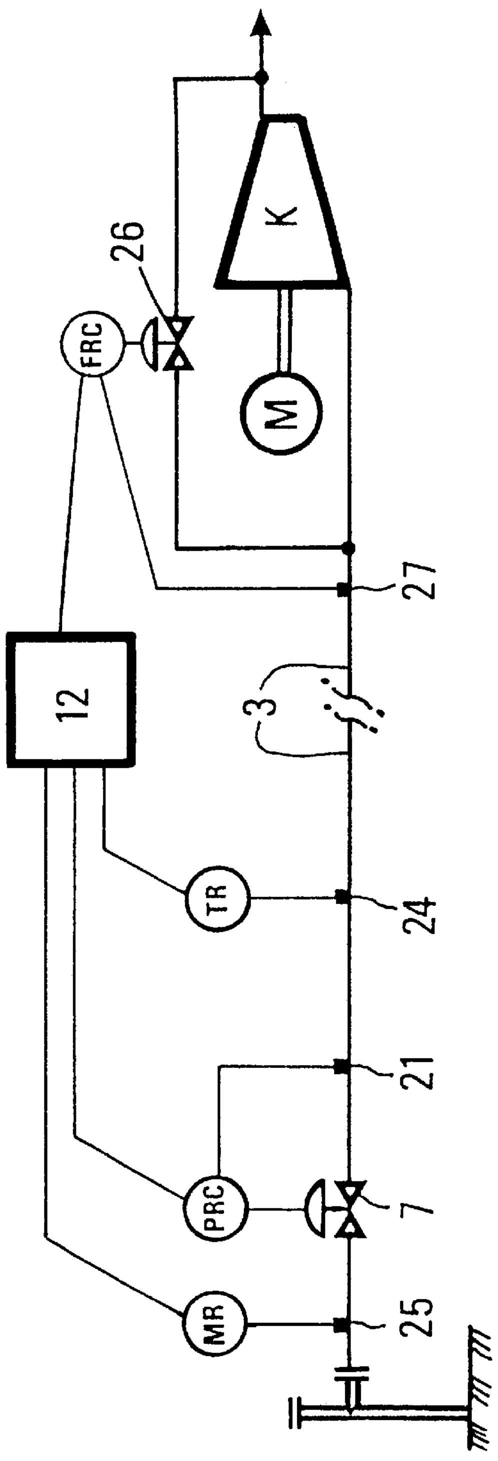
Figure 5C:
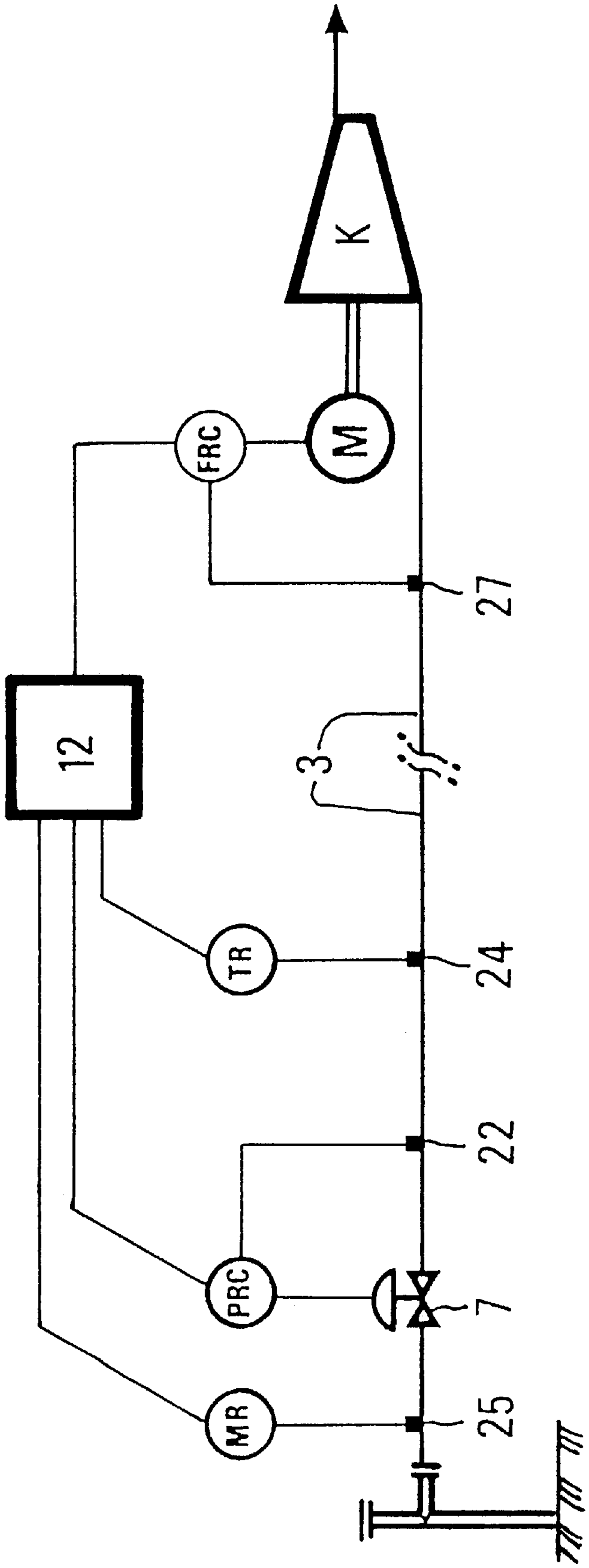

Various examples of configurations or the inclusion of means for controlling hydrate formation and possibly for controlling the flow rate are illustrated in FIGS. 5A to 5C.

The fact that totally separate means are used to adjust the pressure value on the one hand and the value of the effluent flow rate on the other offers a not inconsiderable advantage in the way the production process is handled.

The micro-controller 12, which is shown in the vicinity of the well head in FIG. 1, may just as easily be located on an intermediate platform located above or alternatively in the vicinity of the production unit, for example, or possibly on the main processing platform.

In all the production architectures considered or that might be considered, the micro-controller is linked to the various measuring and control means (valve, means for controlling the flow rate or other factors, for example the inhibitor source, heating means) by physical lines or remote control means or telemetry. The type of link is selected to suit the system architecture and possibly the production zones, taking particular account of the external conditions, such as access to these zones.

Figure 2:
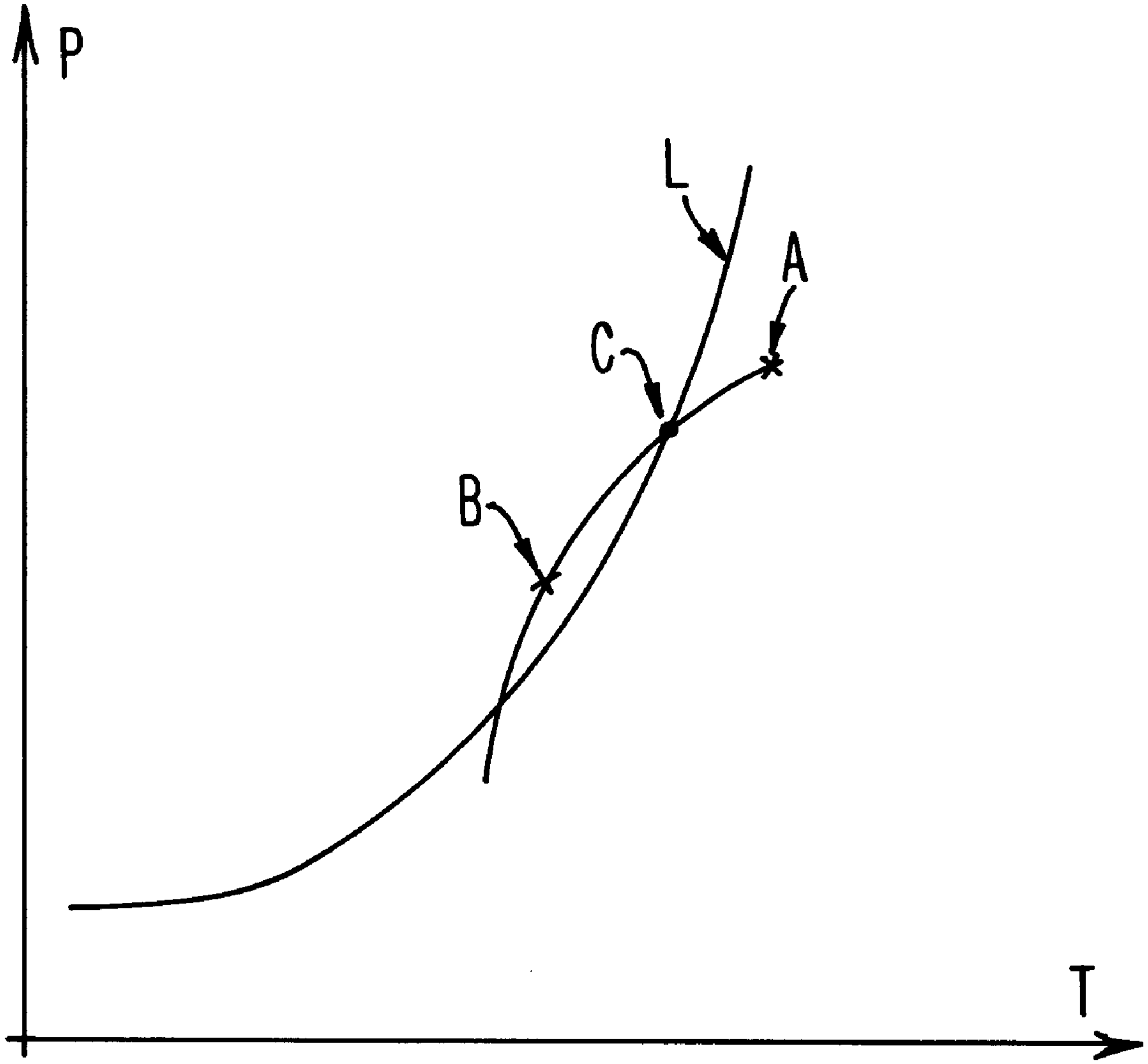

For a given composition of fluid, the hydrate formation range is limited by a pressure P and temperature T limiting curve illustrated in FIG. 2 by reference L.

The limiting curve L incorporates a series of pairs of limiting values ($P_L$, $T_L$), which define the limits for hydrate formation for a given fluid composition.

Under initial well production conditions, the well head pressure value Pw is set by the requirements of the producer, for example, and the temperature of the effluent is often sufficiently high for point A representing the well head pressure Pw and temperature Tw conditions to be located outside the hydrate formation range as shown on the diagram of FIG. 2.

When transported in a subsea pipeline to a processing platform, the effluent temperature is affected by the water temperature, which in certain areas might be in the region of 4° C., for example, and falls as it passes along the pipe. Its pressure also drops due to losses in load pressure.

Given the variations of these two parameters, temperature and pressure, the point representing the temperature and pressure conditions within the effluent may change as shown on a variation chart (P, T) to a point B. located in the hydrate formation range specifically defined by the limiting curve L and overstep this limiting curve at point C, for example. In some instances, a variation in any one of these parameters is enough for the point indicating the start of the hydrate formation range to be passed.

It should also be noted that the fluid may be cooled more rapidly in some zones of the pipe, at the periphery thereof, for example.

The aim of the invention is to prevent the point representing the pressure and temperature conditions at any zone in the pipe from crossing over the limiting curve L into the hydrate formation range.

When production is started, the composition of the petroleum effluent is assessed, for example, and the well head pressure conditions are set accordingly.

This means that the initial data include the well head pressure Pw, the composition of the effluent and the temperature of the effluent at the reservoir outlet, which can be measured using a temperature sensor 9.

During the first step of the process, the micro-controller 12 establishes a relationship between at least two physical parameters associated with hydrate formation, the pressure and temperature for example, so as to define the hydrate formation range of the fluid, which is of a known composition. The micro-controller then numerically determines the limiting pressure value for each temperature, for example, resulting in a series of paired limiting values (pressure $P_L$, temperature $T_L$) which define the limiting points to be complied with if hydrate formation within the fluid is to be prevented.

Figure 3A:
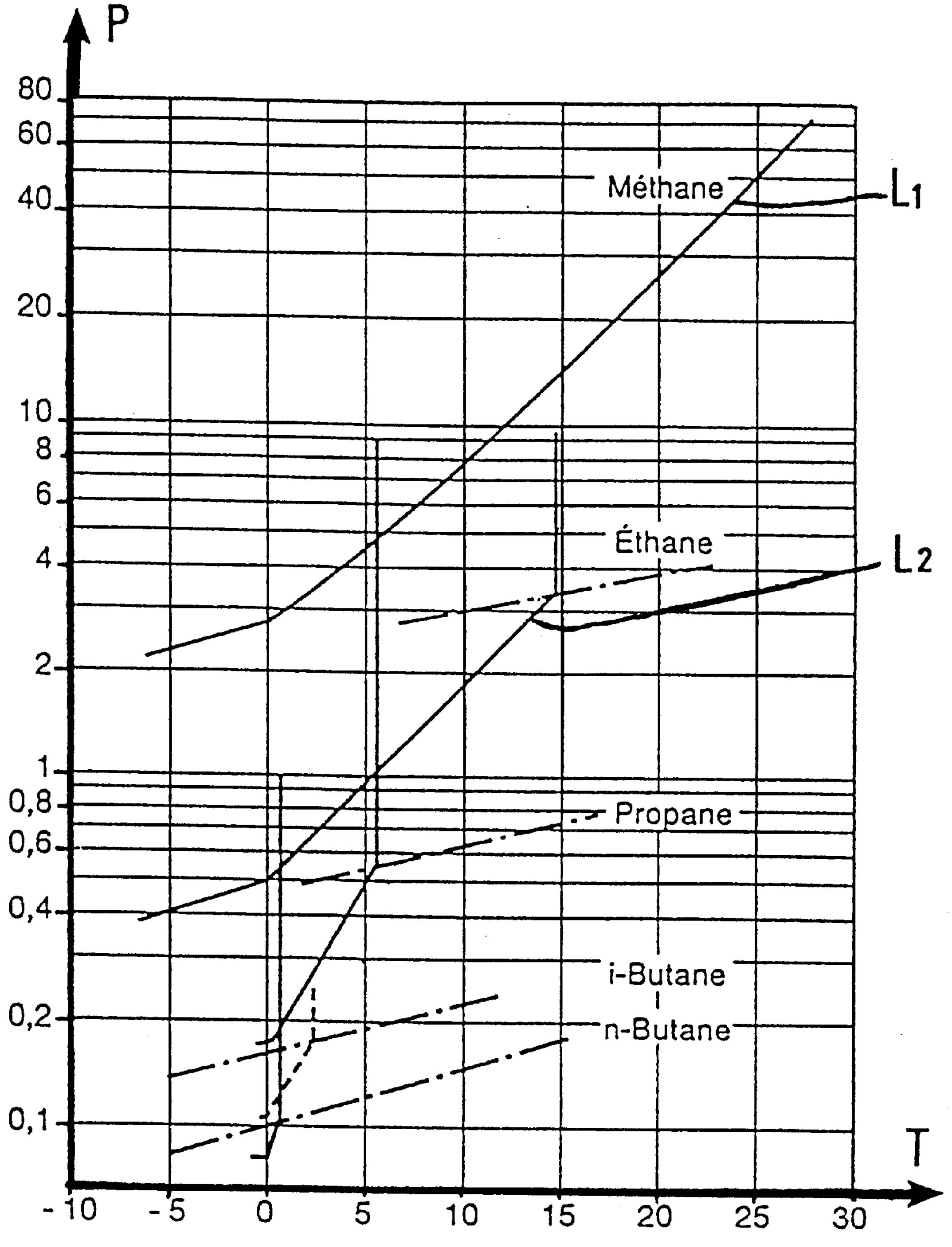

Since the relationship between the temperature and the pressure defining the hydrate formation range is known, a network of curves defining the hydrate formation ranges obtained for fluids of different compositions can be set up. Examples showing such curves for different bodies present in natural gas are given in FIG. 3A.

The prior art describes compositional models enabling the relationship between the temperature and the pressure to be determined, as well as the hydrate formation ranges of any mixture of such constituents.

The second step consists in measuring at least one physical parameter associated with hydrate formation. Advantageously, the pressure is measured at at least one point of the pipe. This measurement can be taken on a continuous basis, for example, or such as to monitor changes in this parameter over time.

The measured pressure value is transmitted from the pressure sensor to the micro-controller 12, which then has the following data available: the relationship determining the limits of the hydrate formation range, the measured pressure value and that representing hydrate formation and the temperature of the effluent, this latter being measured by the temperature sensor or estimated.

These data are then processed in the following way, for example: corresponding to a given temperature value T is a limiting pressure value $P_L$ above which the risk of hydrate formation is high. On the basis of the temperature value Tmes and the relationship established or the hydrate formation range, the micro-controller works out the corresponding value of the pressure limiting value $P_L$. It then compares the measured pressure value Pmes with the limiting pressure value $P_L$. If Pmes is greater than $P_L$, the micro-processor sends a signal to the device for controlling and regulating the adjustable valve opening 7 so as to reduce the pressure and bring it down to a value below or equal to $P_L$.

It is possible to define a safety value around this limiting value. Accordingly, the pressure value can be reduced to a value of $P_L$−x%, for example, which will enable random parameters apart from the temperature, the pressure and composition of the fluid which can displace the hydration formation limiting curve to be dealt with separately.

In the example described above as to how the method is implemented, it is assumed that the composition of the effluent undergoes minimal change and that this change does not have any effect on the hydration formation range.

Advantageously, a second parameter is determined, for example the fluid flow rate, by means of the sensor 10 (FIG. 1).

The micro-controller 12 then processes this information to obtain the temperature and/or pressure P profiles along the pipe. This approach offers the particular advantage of being able to predict where an adjustment is needed over the entire path of the fluid, which makes it possible to make predictions for a greater scope of intervention.

The micro-controller is capable of switching to a sub-programme, for example, for making thermodynamic calculations.

Clearly, parameters other than the pressure value can be measured. For example, it is possible to take a temperature reading at one or more points along the pipe, or alternatively measure the fluid composition or a parameter indicative of the fluid composition. This parameter might be the density of the fluid, for example. This being the case, the micro-controller retrieves the measured temperature and/or density data, for example, and generates a signal to a device allowing this value to be adjusted if necessary. The control system is essentially the same as that controlling the pressure, described above.

Figure 3B:
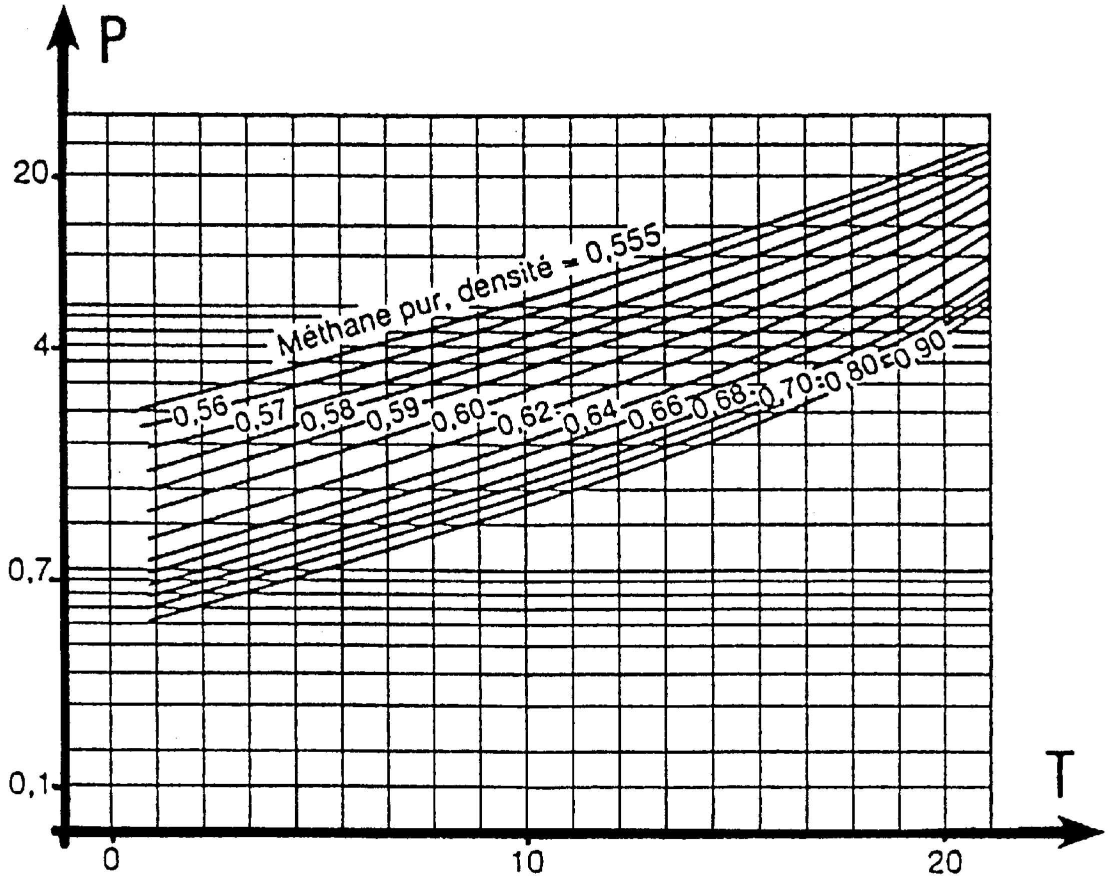

Examples of formation ranges varying as a function of the effluent density are given in FIG. 3B for pure methane, for example, the density of which varies between 0.555 and 0.9.

FIG. 4A illustrates a configuration incorporating heating means 13 positioned close to the well head, for example, and in the vicinity of the temperature sensor 8, both of which are linked to the micro-controller. The controller compares the measured temperature value with a threshold value and issues a command to the heating means to generate sufficient power to increase the temperature to a point outside the hydrate formation range.

This temperature increase may be local or localised at the level of the pressure valve fitted at the well head, for example. Its action may be more general in scope.

The heating means 13 is selected to suit the transfer pipeline, which may be insulated or not. Heating means such as those described in patent U.S. Pat. No. 5,241,147 may be used, for example.

FIG. 4B shows an embodiment of a system of the invention incorporating a device supplying an additive to inhibit hydrate formation, by controlling the composition of the fluid. In this drawing, the means for analyzing the composition of the fluid 11, which may be a device for determining the concentration of inhibitor contained in the fluid for example, is positioned in the vicinity of the well head 1 and linked to the micro-controller 12.

The main platform has an auxiliary source, for example, containing a hydrate formation inhibitor, linked to the production head 1 by means of a pipe 15 fitted with a valve 16.

The micro-controller 12 receives information pertaining to the concentration of inhibitors and compares this with a threshold value and, if necessary, will send a command signal to the valve 16 to inject a certain quantity of the inhibitor from the auxiliary source 14 to the well head 1 by means of the pipe 15, for example. The flow rate of the inhibitor can be easily controlled. An alternative is to measure the flow rate of the inhibitor as it passes through the pipe 15, for example, as well as the flow rate in pipe 3 and derive the inhibitor content therefrom by means of the device 12.

The fluid composition changes frequently during the production life of a reservoir and it may prove necessary to make allowance for this variation in order to correct the hydrate formation range that was defined when the reservoir was initially placed under production, for example.

One.approach is to take account of a parameter that depends on the fluid composition, for example its density, and to determine the changes in this parameter over time. The densimeter 11 used for this purpose is connected to the micro-controller, which takes the readings thereof into account to correct the relationship between the pressure and the temperature and re-define the hydrate formation range, using a network of curves based on density, such as that illustrated in FIG. 3B. This network of curves was worked out beforehand, using several fluid samples of different and known densities under given pressure and temperature conditions, for example.

The fact of reducing the pressure may alter the value of the effluent flow rate inside the pipe.

When transporting petroleum effluent, it has been shown to be of advantage to keep this flow rate at a value substantially close to that fixed by production when a given reservoir was first placed under production.

It is possible to remedy this problem by means of a device for regulating the effluent flow rate, for example, operated independently of the pressure regulating means. Various configurations for these regulating devices are described in FIGS. 5A to 5C and the process is implemented in essentially the same way for all these configurations.

After a pressure variation, the flow meter 10 sends to the micro-controller 12 the measured flow rate Q, for example, this measuring process being triggered by the micro-controller which has compared the decrease in pressure with a limiting value or alternatively by continuous monitoring. It then compares this measured flow rate value Q with a threshold value Qs, defined on the basis of the initial flow rate value Qi, for example, set by the producer, by means of the equation $Qs=Qi+/-y\%$. The quantity y may be defined as a function of the variation in flow rate acceptable to the producer. If the measured flow rate value is located outside the range defined in this manner, the micro-controller sends a signal to the flow regulating device to bring the measured flow rate down to a value located within the range that is acceptable to the producer.

In certain instances, if there is a large drop in pressure through the control valve 17 located on the pipe head because of the large deviation from the well head pressure as a result of the adjustment made to the flow rate and pressure in the pipe in order to correct the pressure so as to prevent hydrate formation, this drop in pressure can give rise to a drop in temperature, which might induce hydrate formation.

In certain instances, this temperature drop can be corrected by using the heating means, such as the means 13 in FIG. 4A.

The micro-controller 12 monitors, for example, the drop or decrease in pressure brought about in order to bring the fluid out of the hydration formation range. If this value is greater than a value DPmax, it issues a command to the heating means, which generates a sufficient quantity of energy or power to bring the fluid temperature outside the critical hydrate formation range. The quantity of energy to be applied can be determined using the drop in pressure and the fluid concerned.

A table of correlations between the heating to be applied and the difference in pressure DP can be determined on the basis of the hydrate formation limiting curves and/or the relationship established for each fluid.

Using another approach, this slide can be corrected by modifying the composition of the fluid, for example, by adding a certain quantity of additive such as a hydrate inhibitor. One possible configuration of the means for introducing this additive is illustrated in FIG. 4B, for example.

To obtain such a result, the micro-controller 12 sends a command signal, for example, to the hydrate inhibitor injection unit (4B) for example, consisting of one or several hydrate inhibitor sources linked to the well head 1 by the valve 16 controlled pipe 15. The micro-controller issues a command for the valve 16 to open so that the flow rate of the inhibitor fed in can be regulated in order to bring the limiting point of hydrate formation down. The quantity of inhibitors to be injected can be controlled on the basis of a relationship or a model linking the quantity of inhibitors to the drop in pressure for a given fluid, for example.

Clearly, without departing from the scope of the invention, the various heating and inhibitor injection means can be used in conjunction to optimise the method of the invention and correct any potential sliding or displacement of the hydrate formation ranges that might occur after a high drop in pressure.

In another approach to implementing the method, the micro-controller may interpret and/or determine models or data capable of taking account of complementary parameters such as the speed of the effluent and any turbulence within the flow in the transfer pipe so as to refine the range x of uncertainties associated with the pressure limiting value.

The hydration formation range can also be determined using prediction models or probabilistic models.

FIGS. 5A to 5C illustrate examples of different possible configurations for incorporating means to regulate the pressure value and means to regulate the flow rate value.

Advantageously, these two means are separate from one another and offer the advantage that these two parameters can be adjusted separately.

In the example illustrated in FIG. 5A, a flow meter is placed at 20 and the flow rate is regulated by means of a control valve 7. A pressure sensor linked to a measuring and control device (PRC) is positioned at 23, a temperature sensor linked to a measuring device (TR) at 24, a densimeter linked to a measuring device (MR) at 25. On the basis of the information transmitted by the sensors located at 20, 24 and 25, the processing and control device 12 determines a pressure limiting value that must not be exceeded at 23 and transmits a signal to the pressure measuring and control device (PRC) which adjusts the speed of the drive motor M of the compressor K so as to adjust the pressure at 23.

In the example illustrated in FIG. 5B, the valve 7 controls the pressure, which is measured by means of a pressure sensor positioned at 21, the pressure measuring and control device (PRC) being controlled by a signal transmitted by the processing and control device 12.

The flow rate is controlled by the valve 26 operated by the flow rate measuring and control device (FRC) on the basis of a signal sent by the processing and control device 12, the flow rate being measured by means of a sensor positioned at 27.

In the example illustrated in FIG. 5C, the valve 7 controls the pressure, as was the case with the example illustrated in FIG. 5B, but the flow rate is controlled by adjusting the drive speed of the motor driving the compressor K, as with the example of FIG. 5A.

In all the examples of embodiments of the invention given, the processing and control device 12 is designed so that at any instant it will store and process measured and programmed data and carry out calculations that enable the limiting values of the measured parameters to be worked out, such as the temperature and pressure.

In order to carry out these calculations, the micro-controller uses a software for determining the hydrate formation range, for example.

Various types of software can be used and the software may be of the type that implements a compositional model such as the Ng and Robinson models, for example, described in chapter 6 of the work entitled "Natural gas" (A. Rojey et al, published in 1994 by Editions Technip), or alternatively simplified empirical models in which the effect of the composition is taken into account on the basis of density, these models being based on expressing a network of curves in the form of analytical relationships, such as those shown in FIG. 3B.

The various measuring and analysis means described above and implemented within the scope of the invention may be located close to the reservoir, on an intermediate platform or on a level with the processing site and final destination, depending on how easy it is to gain access to the production reservoirs.

The intermediate platform may be a floating mooring, which is mobile and can easily be moved from one production site to another to suit requirements and specific production conditions.

The various devices used to adjust at least one parameter to maintain and/or bring the fluid outside the hydrate formation range, for example the pressure control valves, the speed control means for the motor, the heating means and the hydrate inhibitor injection means can be used alone or in conjunction with each other without departing from the scope of the invention.

These devices and the configuration thereof will be specifically selected to suit production conditions.

A means for pre-treating the effluent can be incorporated in the system described above, such as a water separator allowing at least some of the water to be removed if the effluent contains a high quantity of aqueous phase.

The method and the device of the present invention may be considered for on-off applications or applications with a restricted or limited scope, in which case the device is positioned at the locations where hydrates are likely to form.

The method and the system of the invention can be used to advantage in the event of a production stoppage. The stoppage will be detected by the micro-controller, for example, when a flow rate measurement is moving towards 0. As soon as it receives information indicating a production stoppage, the micro-controller sends a signal to reduce and maintain the pressure below a threshold value, for example.

When production is restarted, the micro-controller can re-establish the desired pressure and temperature conditions by controlling changes in the pressure and temperature curve so as to prevent the fluid from entering the hydrate formation range.

I claim:

1. Method for preventing formation of hydrates in a multi-phase fluid containing at least one gaseous phase and water, the fluid being susceptible to the formation of hydrates under given thermodynamic conditions, comprising:

a) determining at least one relationship between at least a first and a second physical parameter affecting the formation of hydrates, the physical parameters being selected from the group consisting of pressure P, the temperature T, a parameter associated with the fluid composition and the fluid composition itself, the relationship enabling at least one hydrate formation range to be defined, b) measuring at least one of the physical parameters, and c) adjusting at least one of the physical parameters to cause the fluid to be outside the hydrate formation range.

2. Method as claimed in claim 1, wherein another parameter is determined and, on the basis of the value the another parameter and the value of the physical parameter measured during step b), at least one of temperature and pressure profiles along the pipeline are determined and at least one of the parameters is adjusted during step c) so as to cause the fluid to be outside the hydrate formation range.

3. Method as claimed in claim 1, wherein the fluid is being transported in a pipe and the method further comprises determining a value of fluid flow rate in the pipe and controlling the fluid flow rate during a separate step c).

4. Method as claimed in claim 1, wherein the fluid is being transported in a pipe and the physical parameter measured during step b) is the pressure P in at least one zone of the pipe.

5. Method as claimed in claim 1, wherein the fluid is being transported in a pine and the physical parameter measured during step b) is the temperature T in at least one zone of the pipe and the temperature T is adjusted in step c) by applying thermal energy to the fluid.

6. Method as claimed in claim 1, wherein the physical parameter measured in step b) is density of the fluid as the parameter associated with the composition of the fluid.

7. Method as claimed in claim 1, wherein the physical parameter measured in step b) is a concentration of an inhibitor product present in the fluid, and the concentration is adjusted in step c) by regulating a rate at which the inhibitor is injected into the fluid.

8. Method as claimed in claim 1, wherein the fluid is being transported in a pipe and the physical parameter measured during step b) is the pressure P in at least one zone of the pipe, and the value of the said pressure is adjusted in step c) to cause the fluid to be outside the hydrate formation range as long as the pressure P is greater than or equal to a set limiting value P1 and, when the pressure falls below the set limiting value P1, adjustments are made to the temperature T, and/or a composition of the fluid by adding a certain quantity of inhibitors, thus causing the fluid to be outside the hydrate formation range.

9. Application of the method as claimed in claim 1, to production of the fluid wherein, during a production stoppage, the value of the physical parameter measured during step b) is adjusted in step c) to cause the fluid to be outside the hydrate formation range.

10. Method as claimed in claim 1, wherein the fluid is selected from the group consisting of a multi-phase petroleum effluent and a fluid containing natural gas.

11. System by which a multi-phase fluid containing at least one gaseous phase and water can be transported by pipeline from one location to a point of destination, the fluid being susceptible to the formation of hydrates under given thermodynamic conditions, comprising the combination of:

at least one device for measuring at least one physical parameter indicative of at least one of temperature, pressure, composition of the fluid and a parameter associated with the composition of the fluid, and a processing and control device capable of processing a relationship between the physical parameters affecting hydrate formation, defining hydrate formation ranges and determining a limiting value for at least one of the physical parameters, and capable of issuing at least one signal to adjust a value of at least one of the physical parameters so as to cause the fluid to be outside the hydrate formation range.

12. System as claimed in claim 11, further comprising means for determining and controlling a flow rate of the fluid in the pipe.

13. System as claimed in claim 11, wherein the at least one device for measuring at least one physical parameter is positioned at least one of a pipe inlet and a pipe outlet close to the point of destination.

14. System as claimed in claim 11, wherein the processing and control device is designed so as to determine a temperature profile prevailing in the pipe and to derive therefrom a value of the limiting pressure at which hydrates form over at least a portion of the pipe run.

15. System as claimed in claim 14, wherein the processing and control device is capable of identifying and predicting zones of hydrate formation.

* * * * *